(12) United States Patent
Whang et al.

(10) Patent No.: US 8,117,406 B2
(45) Date of Patent: Feb. 14, 2012

(54) METHOD OF STORING DATA INTO FLASH MEMORY IN A DBMS-INDEPENDENT MANNER USING THE PAGE-DIFFERENTIAL

(75) Inventors: Kyu-Young Whang, Daejeon (KR); Yi-Reun Kim, Kwangju (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 337 days.

(21) Appl. No.: 12/507,946

(22) Filed: Jul. 23, 2009

(65) Prior Publication Data
US 2010/0241790 A1    Sep. 23, 2010

(30) Foreign Application Priority Data

Mar. 18, 2009  (KR) .................... 10-2009-0022955
Apr. 23, 2009  (KR) .................... 10-2009-0035341

(51) Int. Cl.
*G06F 13/00*    (2006.01)
(52) U.S. Cl. ...................................... 711/154; 711/103
(58) Field of Classification Search .................. 711/103, 711/154
See application file for complete search history.

(56) References Cited

U.S. PATENT DOCUMENTS

| | | | |
|---|---|---|---|
| 6,568,510 B2 * | 5/2003 | Cavaleri et al. | 365/185.12 |
| 6,714,453 B2 * | 3/2004 | Cavaleri et al. | 365/185.12 |
| 2008/0068894 A1 | 3/2008 | Lohse et al. | |

OTHER PUBLICATIONS

Chang, Li-Pin et al., "An Efficient Management Scheme for Large-Scale Flash-Memory Storage Systems," *Proceedings of the 2004 ACM Symposium on Applied Computing*, pp. 862-868 (2004).
Gal, Eran et al., "Algorithms and Data Structures for Flash Memories," *ACM Computing Surveys*, vol. 37(2):138-163 (2005).
Kawaguchi, Atsuo et al., "A Flash-Memory Based File System," Proceedings of the USENIX 1995 Technical Conference (1995).
Koltsidas, Ioannis et al., "Flashing Up the Storage Layer," *Proc. Int'l. Conf. on Very Large Data Bases (VLDB)*, vol. 1(1):514-525 (2008).
Lee, Sang-Won et al., "Design of Flash-Based DMBS: An In-Page Logging Approach," *Proc. Int'l. Conf. on Management of Data* (2007).
Lee, Sang-Won et al., "FAST: An Efficient Flash Translation Layer for Flash Memory," *Proc. 1st Int'l. Workshop on Embedded Software Optimization (ESO)*, (2006).

(Continued)

*Primary Examiner* — Reba I. Elmore
(74) *Attorney, Agent, or Firm* — Nelson Mullins Riley & Scarborough LLP; EuiHoon Lee, Esq.

(57) ABSTRACT

The present invention proposes an effective and efficient method of storing data called page-differential logging for flash-based storage systems. The primary characteristics of the invention are: (1) it writes only the page-differential that is defined as the difference between an original page in flash memory and an up-to-date page in memory; (2) it computes and writes the page-differential only when an updated page needs to be reflected into flash memory. When an updated page needs to be reflected into flash memory, the present invention stores the page into a base page and a differential page in flash memory. When a page is recreated from flash memory, it reads the base page and the differential page, and then, creates the page by merging the base page with its page-differential in the differential page. This invention significantly improves I/O performance of flash-based storage systems compared with existing page-based and log-based methods.

20 Claims, 23 Drawing Sheets

OTHER PUBLICATIONS

Nath, Suman et al., "Online Maintenance of Very Large Random Samples on Flash Storage," *Proc. Int'l. Conf. on Very Large Data Bases* (*VLDB*), (2008).

Park, Chanik et al., "Cost-Efficient Memory Architecture Design of NAND Flash Memory Embedded Systems," *Proceedings of the 21st International Conference on Computer Design (ICCD'03)*, (2003).

Rosenblum, Mendel et al., "The Design and Implementation of a Log-Structured File System," *ACM Transactions on Computer Systems*, vol. 10(1):26-52 (1992).

Samsung, "K9XXG08UXM," www.DataSheet4U.com (2005).

Woodhouse, David, "JFFS: The Journalling Flash File System," *Proc. Ottawa Linux Symposium*, (2001).

Wu, Chin-Hsien et al., "An Efficient B-Tree Layer Implementation for Flash-Memory Storage Systems," *ACM Transactions on Embedded Computing Systems*, vol. 6(3) (2007).

\* cited by examiner

Prior Art

Prior Art

Prior Art

Prior Art

Prior Art

Prior Art

Prior Art

Prior Art

Prior Art

Algorithm *PageDifferentialLogging_Writing:*

Inputs: (1) The updated logical page $p$
(2) The physical page identifier *pid* of the page $p$

Algorithm:

Step 1. Reading the original base page 1.1 Read base_page(*pid*) from flash memory.

Step 2. Creating a differential 2.1 Create differential(*pid*) by comparing base_page(*pid*) read form flash memory with the updated logical page $p$ given by the input.

Step 3. Writing the differential into the differential write buffer

If old differential(*pid*) resides in the buffer, remove the old one, and then, write the new one created in Step 2.

Here, there are three cases according to the size of differential(*pid*).

Case 1: If the size of differential(*pid*) ≤ the free space of the buffer,
write differential(*pid*) into the buffer.

Case 2: If the size of differential(*pid*) > the free space of the buffer and
the size of differential(*pid*) ≤ the size of one physical page,
call the function writingDifferentialWriteBuffer( ),
clear the buffer, and
write differential(*pid*) into the buffer.

Case 3: If the size of differential(*pid*) ≥ the size of one physical page,
discard differential(*pid*) and
call the function writingNewBasePage( ).

Fig.7a

Function *writingDifferentialWriteBuffer( )*:

Input: The differential write buffer *dwb*

Algorithm:

Step 1. Writing the differential write buffer *dwb* into flash memory 1.1 Write its contents into a physical page $q$ that is newly allocated in flash memory.

Step 2. Updating the physical page mapping table *ppmt* and the valid differential count table *vdct*

For each differential $d$ in the buffer *dwb*, perform the following procedures.

2.1 Update the table *ppmt* so that the differential page of the logical page to which the differential $d$ belongs is set to the physical page $q$.

2.2 When an old differential page of the logical page to which the differential belongs is not null, decrease the count for the old differential page in the table *vdct* by 1.

Here, if the count becomes 0, set the differential page to obsolete.

Further, increase the count for the new differential page $q$ in the table *vdct* by 1.

Fig.7b

Function *writingNewBasePage()*:

Input: The logical page *p*

Algorithm:

Step 1. Writing a base page into flash memory 1.1 Write the logical page *p* itself into a physical page *q* that is newly allocated in flash memory.

Step 2. Updating the physical page mapping table *ppmt* and the valid differential count table *vdct*

2.1 Update the table *ppmt* so that the base page and the differential page of the logical page *p* are set to the physical page *q* and null, respectively (in this case, the differential page of the logical page *p* does not exist).

2.2 When an old differential page of the logical page is not null, decrease the count for the old differential page in the table *vdct* by 1. Here, if the count becomes 0, set the differential page to obsolete.

2.3 Set the old base page of the logical page *p* to obsolete.

Fig.7c

Algorithm *PageDifferentialLogging_Reading*

Input: The physical page identifier *pid*

Output: The logical page *p*

Algorithm:

Step 1. Reading the base page 1.1 Read base_page(*pid*) from flash memory.

Step 2. Finding the differential

Case 1: If differential(*pid*) resides in the differential write buffer, find differential(*pid*) from the buffer.

Case 2: If differential(*pid*) does not reside in the differential write buffer, read differential_page(*pid*) from flash memory, and then, find differential(*pid*) from differential_page(*pid*).

Here, if differential_page(*pid*) does not exist in flash memory, return base_page(*pid*) as the result *p*.

Step 3. Merging the base page with the differential 3.1 Merge base_page(*pid*) with differential(*pid*) to make *p*, and then, return *p* as the result.

Fig.9

METHOD OF STORING DATA INTO FLASH MEMORY IN A DBMS-INDEPENDENT MANNER USING THE PAGE-DIFFERENTIAL

This patent application claims the benefit of priority under 35 U.S.C. §119 from Korean Patent Application No. 10-2009-0022955 filed Mar. 18, 2009, and Korean Patent Application No. 10-2009-0035341 filed Apr. 23, 2009, the contents of which are incorporated herein by reference.

BACKGROUND OF THE INVENTION

1. Field of the Invention

The present invention relates to a method of storing data into flash memory in a Database Management System (DBMS)-independent manner using the page-differential.

2. Description of the Related Art

Flash memory is classified into two types—NAND type and NOR type—according to the structure of a memory cell. The former is suitable for storing data, and the latter for storing code. In the present invention, the term 'flash memory' means the NAND-type flash memory that is widely used in flash-based storage systems.

FIG. 1 is a diagram showing the structure of flash memory. The flash memory is composed of $N_{block}$ blocks, and each block is composed of $N_{page}$ pages. A page is the smallest unit of reading or writing data. A block is the smallest unit of erasing data. Each page is composed of a data area for storing data and a spare area for storing auxiliary information such as page status, bad block identification, and error correction check (ECC).

In order to read or write data from or into flash memory, there are three types of operations: read, write and erase.

Read operation: return all bits in a specific page

Write operation: change bits selected in a specific page from 1 to 0

Erase operation: set all bits in a specific block to 1

Operations in the flash memory are much different from those in the magnetic disk. First, all the bits in flash memory are initially set to 1. Therefore, the write operation in flash memory means selectively changing some bits in a specific page from 1 to 0. Next, the erase operation in flash memory means changing all the bits in a specific block back to 1. Each block can sustain only a limited number of erase operations, which is restricted to about 100,000. When more than 100,000 erase operations are performed, data may be unreliable.

Due to the restriction of write and erase operations, a write operation is generally preceded by an erase operation in order to overwrite a page. After all the bits in a block are changed to 1 by performing an erase operation, some bits in a page are changed to 0 by performing a write operation. Further, the erase operation is performed on a much larger unit than the write operation. That is, the write operation is performed on a page, whereas the erase operation is performed on a block. Detailed methods of overwriting a page are determined according to the page update method employed.

Flash memory is classified into two types—Single Level Cell (SLC) type and Multi-Level Cell (MLC) type—according to the capacity of a memory cell. The former is capable of storing one data bit per cell, whereas the latter is capable of storing two (or more) data bits per cell. Therefore, MLC-type flash memory has larger capacity than SLC-type flash memory and is predicted to be widely used in high-capacity flash storage. Table 1 summarizes the parameters and values of MLC-type flash memory. The size of a page is 2,048 bytes, and a block has 64 pages. In addition, the access time of operations increases in the order of read, write, and erase operations. The read operation is 7.9 times faster than the write operation, which is 1.6 times faster than the erase operation.

TABLE 1

Parameters and values of flash memory (Samsung K9L8G08U0M 4 GB MLC NAND)

| Symbols | Definitions | values |
| --- | --- | --- |
| $N_{block}$ | The number of blocks | 32,768 |
| $N_{page}$ | The number of pages in a block | 64 |
| $S_{block}$ | The size of a block (bytes) (=$N_{page} \times S_{page}$) | 135,168 (64 × 2,112) |
| $S_{page}$ | The size of a page (bytes) (=$S_{data} + S_{spare}$) | 2,112 (=2,048 + 64) |
| $S_{data}$ | The size of data area in a page (bytes) | 2,048 |
| $S_{spare}$ | The size of spare area in a page (bytes) | 64 |
| $T_{read}$ | The required time for reading a page (µs) | 120 |
| $T_{write}$ | The required time for writing a page (µs) | 950 |
| $T_{erase}$ | The required time for erasing a block (µs) | 1500 |

Hereinafter, in order to reduce ambiguity in the present invention, a physical page and a logical page are distinguished from each other. Pages in memory are called logical pages, and pages in flash memory are called physical pages. Further, for convenience of description, it is assumed that the size of a logical page is equal to that of a physical page.

There have been a number of methods of storing updated pages into flash memory for flash-based store systems. In the present invention, these methods are called page update methods. Page update methods are divided into two categories: page-based and log-based.

The page-based methods store a logical page into a physical page. When an updated page needs to be reflected into flash memory (for example, when the updated page is swapped out from the DBMS buffer to the database), the whole logical page is written into a physical page. When a logical page is recreated from flash memory (for example, when a page is read into the DBMS buffer), the logical page is read from a physical page. These methods can be implemented in a middle layer called the Flash Translation Layer (FTL). Thus, they are loosely coupled with the storage system. The FTL maintains logical-to-physical address mapping between logical pages and physical pages, as shown in FIG. 2. The FTL can be implemented as hardware in a controller residing in Solid State Disks (SSD's), or can be implemented as software in an operating system (OS) for embedded boards.

Page-based methods are classified into two schemes—in-place update and out-place update—depending on whether or not a logical page is always written into the same physical page. When a logical page needs to be reflected into flash memory, the in-place update method overwrites the page into the specific physical page that was read, and the out-place update method writes the page into a new physical page.

Since write operation cannot change bits in a page to 1, the in-place update method performs the following four steps when overwriting the logical page $m_1$ read from the physical page $p_1$ in the block $b_1$ into the same physical page $p_1$.

First, all pages, except $p_1$, in the block $b_1$ are read from the block $b_1$.

Second, an erase operation is performed on the block $b_1$.

Third, the logical page $m_1$ is written into the physical page $p_1$.

Fourth, all pages, except $m_1$, read at the first step are written into the corresponding pages in the block $b_1$.

Therefore, since the in-place update method causes one erase operation and multiple read and write operations whenever a logical page needs to be reflected into flash memory, it suffers from severe performance problems and is rarely used in flash-based storage systems.

In order to solve the problem of the in-place update method, the out-place update method writes the logical page $m_1$ into a new physical page $p_2$, and then, sets the physical page $p_1$ to obsolete when the logical page $m_1$ needs to be reflected into flash memory. When free pages in flash memory are insufficient, obsolete pages are converted into free pages through garbage collection.

The out-place update method is widely used in flash-based storage systems because an erase operation does not occur whenever a logical page needs to be reflected into flash memory. FIGS. 3A and 3B illustrate an example of the out-place update method. FIG. 3A illustrates the logical page $m_1$ read from the physical page $p_1$ in the block $b_1$. FIG. 3B illustrates the updated logical page $m_1$ and the process of writing it into the physical page $p_2$, where $p_1$ is an original page read, and $p_2$ is a new page written.

Log-based methods generally store a logical page into multiple physical pages. When a logical page is updated, the update logs of logical pages are first collected into a write buffer in memory. Here, an update log represents the changes in a page resulted in a single update command. Further, when the buffer is full, the buffer is written into a physical page. Therefore, when a logical page is frequently updated, the update logs of the page are stored into multiple physical pages. Accordingly, when a logical page is recreated, multiple physical pages may be read and merged. In addition, the log-based methods are tightly-coupled with the storage system because the storage system must be modified to be able to identify the update logs of a logical page.

Among the log-based methods, there are Log-Structured File System (LFS), Journaling Flash File System (JFFS), Yet Another Flash File System (YAFFS), and In-Page Logging (IPL). LFS, JFFS, and YAFFS write the update logs of a logical page into arbitrary log pages in flash memory, whereas IPL writes the update logs into specific log pages. IPL divides pages in each block into a fixed number of original pages and log pages. This method writes the update logs of a logical page into only the log pages in the block containing the original page of the logical page. Therefore, when a logical page is recreated, IPL reads original pages and only log pages in the block. When there is no free log page in the block, IPL merges original pages and log pages in a block, and writes the merged pages into pages in a new block (this process is called 'merging').

Compared to other log-based methods, IPL improves read performance by reducing the number of log pages to read from flash memory when a logical page is recreated because the number of log pages is not infinitely increased due to merging. Since IPL inherits the advantage/disadvantage of the log-based methods except for the effect of merging, it has performance similar to that of other log-based methods.

FIGS. 4A to 4B illustrate an example of the log-based methods.

FIG. 4A illustrates the logical pages $m_1$ and $m_2$ in memory.

FIG. 4B illustrates the update logs $q_1$ and $q_2$ of the logical pages $m_1$ and $m_2$, and the process of writing $q_1$ and $q_2$ into flash memory. After $q_1$ and $q_2$ are written into the write buffer, the content in the buffer is written into the log page $p_3$. Therefore, the update logs $q_1$ and $q_2$ are collected into the same log page $p_3$.

FIG. 4C illustrates the update logs $q_3$ and $q_4$ of the logical pages $m_1$ and $m_2$, and the process of writing $q_3$ and $q_4$ into flash memory. After $q_3$ and $q_4$ are written into the write buffer, the content in the buffer is written into the log page $p_4$. Therefore, the update logs $q_3$ and $q_4$ are collected into the same log page $p_4$.

FIG. 4D illustrates the logical page $m_1$ recreated from flash memory.

FIG. 4E illustrates the process of creating the logical page $m_1$ in FIG. 4D. Here, the logical page $m_1$ is recreated by merging the original page $p_1$ with the update logs $q_1$ and $q_2$ read from the log pages $p_3$ and $p_4$, respectively.

Compared with the log-based methods, the page-based methods write not only the changed parts but also unchanged parts in a page. In contrast, the log-based methods write only update logs. Therefore, when updates do not frequently occur, the page-based methods have worse write performance than the log-based methods. The page-based methods write an update page into flash memory only when the updated page needs to be reflected into flash memory. However, the log-based methods write update logs into the write buffer whenever a logical page is updated. When the buffer is full, the buffer is written into flash memory. Therefore, when updates frequently occur, a logical page is updated many times, and thus, the total size of update logs of one page may be larger than the size of one page. In this case, the page-based methods have better write performance than the log-based methods.

Next, when a logical page is recreated from flash memory, the page-based methods require only a single read operation since the logical page is stored into one physical page. In contrast, the log-based methods require multiple read operations since a logical page is stored into multiple physical pages. Consequently, the page-based methods have better read performance than the log-based methods.

Finally, the page-based methods are DBMS-independent, whereas the log-based methods are DBMS-dependent.

TABLE 2

Comparison of page-based methods with log-based methods

|  | Page-based methods | log-based methods |
| --- | --- | --- |
| The data to be written into flash memory | The whole page (changed and unchanged parts) | the update log (changed part only) |
| The time that writes the data into flash memory | When a page needs to be reflected into flash memory | When write buffer is full |
| The number of physical pages to be read when recreating a logical page | One page | Multiple pages |
| Architecture | Loosely coupled (DBMS-independent) | Tightly coupled (DBMS-dependent) |

SUMMARY OF THE INVENTION

Accordingly, the present invention has been made keeping in mind the above problems occurring in the prior art, and an objective of the present invention is to provide a page update method called page-differential logging, which has excellent performance for both read and write operations, and thus remarkably improving performance of flash memory-based storage systems.

A page-differential (simply called a 'differential') is the difference between an original page in flash memory and an up-to-date page in memory. The page-differential logging method is a new approach to storing data into flash memory. It is much different from the page-based methods or log-based methods from the following aspects:

(1) The proposed method writes only the differential of an update page. This characteristic is contrasted with existing page-based methods that write the whole page including both changed and unchanged parts of data, or existing log-based methods that keep the history of all changes in a page (i.e., multiple update logs). In addition, the differential is computed and written only when an updated page needs to be reflected into flash memory but not being computed and written whenever a page is updated in memory. The present method reads the original page of the update logical page from flash memory, and then, generates the differential for the updated page by computing the difference between the original page and the updated logical page. In flash memory, since the speed of a read operation is much faster than that of a write or erase operation, the overhead for generating a differential is relatively minor.

(2) When a page is recreated from flash memory, the proposed method reads at most two pages (i.e., an original page and one page including a differential), and thus, requires fewer read operations than the log-based methods.

(3) When an update page needs to be reflected into flash memory, the proposed method writes only the differential, and thus, requires fewer write operations than the log-based or page-based methods.

(4) Log-based methods are tightly-coupled with a storage system, whereas the proposed method is loosely-coupled with the system. Since the log-based methods must identify changes in a page whenever the page is updated, the storage management module of the DBMS needs to be modified. Since the changes are internally maintained by the system, they can be identified only inside the storage management module. In contrast, since the proposed method computes a differential by comparing a logical page that needs to be reflected into flash memory with an original page in flash memory outside the storage management module, the storage management module does not need to be modified.

In order to accomplish the above objective, the present invention provides a method of storing data into flash memory in a database management system (DBMS)-independent manner using the page-differential, comprising a writing step of storing a logical page into a base page and a differential page in flash memory and a recreating step of reading the base page and the differential page and creating a logical page by merging the base page with the differential in the differential page.

Preferably, the writing step comprises a differential generating step of generating a differential by comparing the logical page with the base page in flash memory, a differential writing step of writing the generated differential into the write buffer, and a buffer writing step of writing the content of the buffer into flash memory when the buffer is full.

Preferably, the base page contains the whole logical page.

Preferably, the differential page can contain differentials of multiple logical pages.

Preferably, the differential is the difference between the base page and the logical page.

Preferably, the writing step is performed only when an updated logical page needs to be reflected into flash memory, but not being performed whenever the page is updated in memory.

Preferably, the writing step comprises a first step of reading the base page of the logical page from flash memory, a second step of generating the differential for the logical page by comparing the base page read at the first step with the logical page, and a third step of removing an old differential if the old differential resides in the write buffer, and then, writing the generated differential into the write buffer.

Preferably, the third step is a step of, if the size of the differential is equal to or smaller than the free space of the write buffer, writing the generated differential into the buffer.

Preferably, the third step comprises the steps of, if the size of the differential is larger than the free space of the write buffer, but is equal to or less than that of one physical page, writing the content of the buffer into flash memory, clearing the buffer, and writing the differential into the buffer.

Preferably, the third step comprises the steps of, if the size of the differential is larger than that of one physical page, discarding the differential and writing the logical page itself into flash memory as a new base page.

Preferably, the recreating step comprises a first step of reading the base page of the logical page from flash memory, a second step of finding the differential of the logical page, and a third step of creating a logical page by merging the base page read at the first step with the differential found at the second step, and thereafter, returning the logical page as the result.

Preferably, the second step is performed to find the differential of the logical page from the write buffer if the differential resides in the buffer.

Preferably, the second step is performed to read the differential page of the logical page from flash memory, and then, find the differential from the differential page read if the differential does not reside in the buffer.

BRIEF DESCRIPTION OF THE DRAWINGS

The above and other objectives, features and other advantages of the present invention will be more clearly understood from the following detailed description taken in conjunction with the accompanying drawings, in which:

FIG. 7A is a diagram showing the algorithm for writing a logical page into flash memory;

FIG. 7B is a diagram showing the function writingDifferentialWriteBuffer used in FIG. 7A;

FIG. 7C is a diagram showing the function writingNewBasePage used in FIG. 7A;

FIG. 9 is a diagram showing the algorithm for recreating a logical page from flash memory.

DESCRIPTION OF THE PREFERRED EMBODIMENTS

Figure 1:
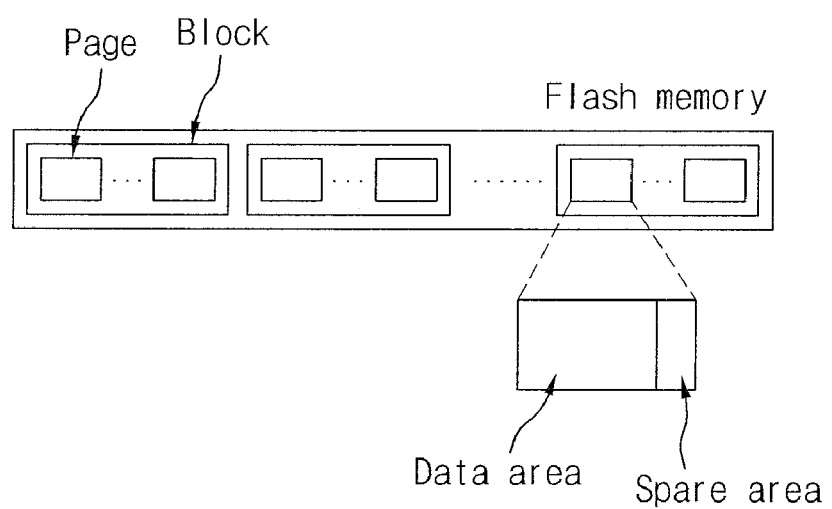
FIG. 1 is a diagram showing the structure of flash memory.
Figure 2:
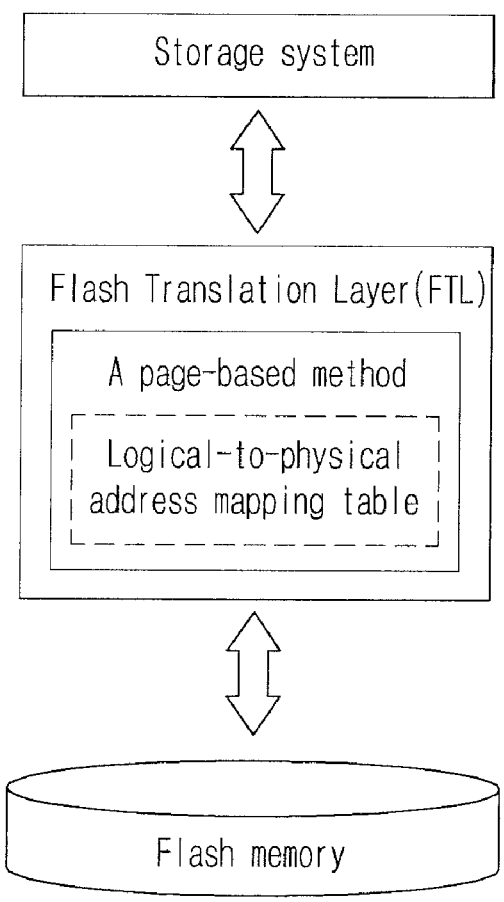
FIG. 2 is a diagram showing the architecture of the page-based approach.
Figure 3A:
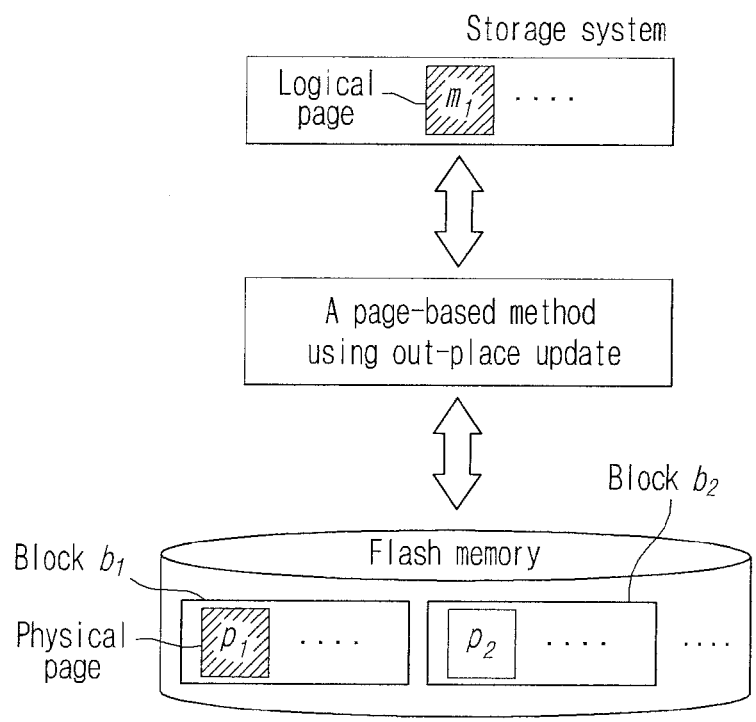
FIG. 3A is a diagram showing the logical page $m_1$ read from the physical page $p_1$ in the block $b_1$ in an example of the out-place update method.
Figure 3B:
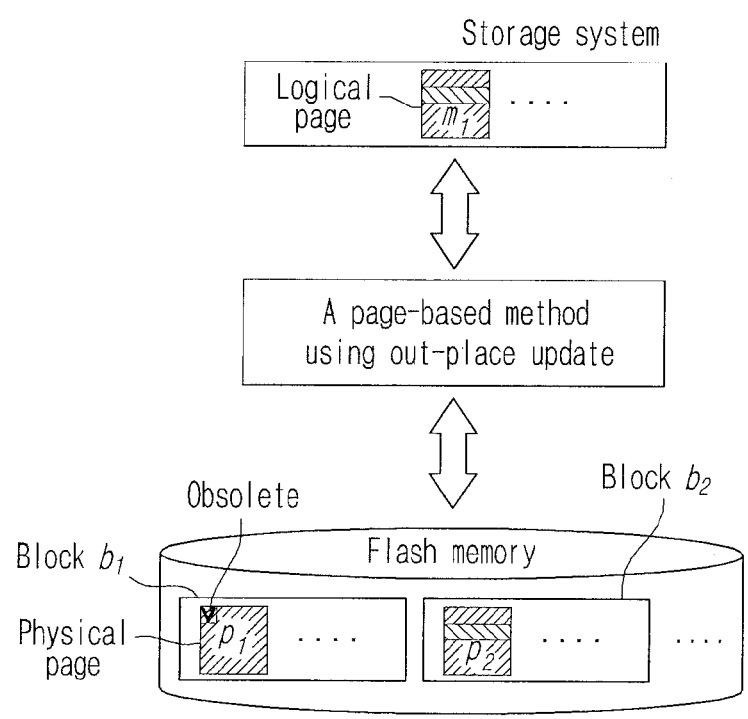
FIG. 3B is a diagram showing the updated logical page $m_1$ and the process of writing it into the physical page $p_2$ in an example of the out-place update method.
Figure 4A:
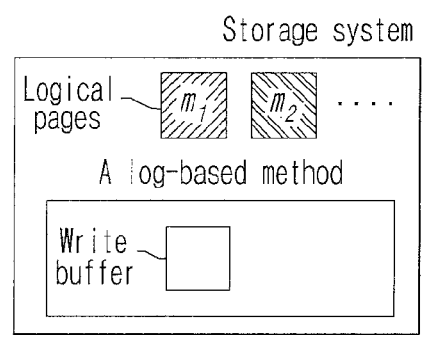
FIG. 4A is a diagram showing the logical pages $m_1$ and $m_2$ in memory in an example of the log-based approach.
Figure 4B:
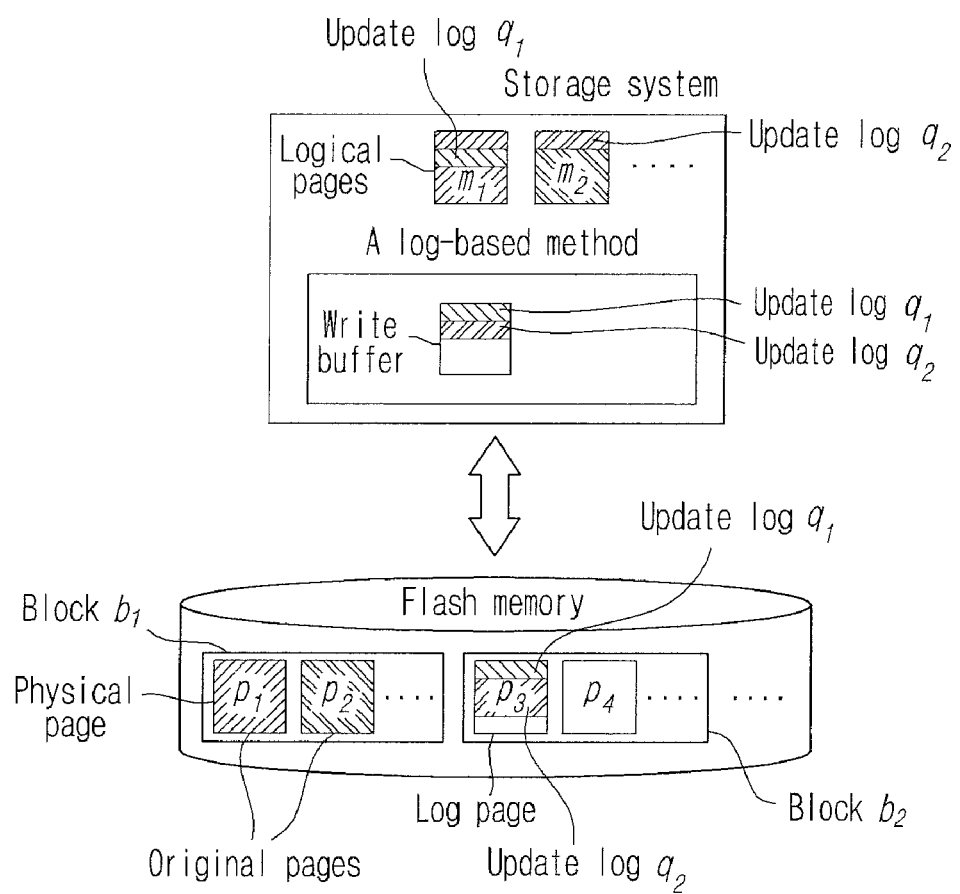
FIG. 4B is a diagram showing the update logs $q_1$ and $q_2$ of the logical pages $m_1$ and $m_2$, and the process of writing them into flash memory in an example of the log-based approach.
Figure 4C:
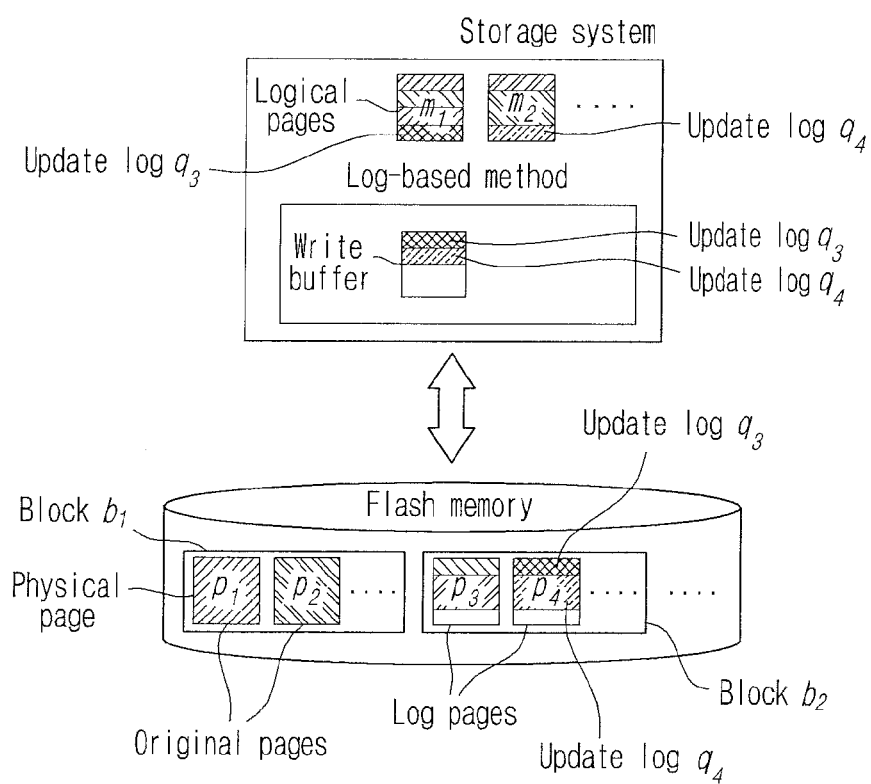
FIG. 4C is a diagram showing the update logs $q_3$ and $q_4$ of the logical pages $m_1$ and $m_2$, and the process of writing them into flash memory in an example of the log-based approach.
Figure 4D:
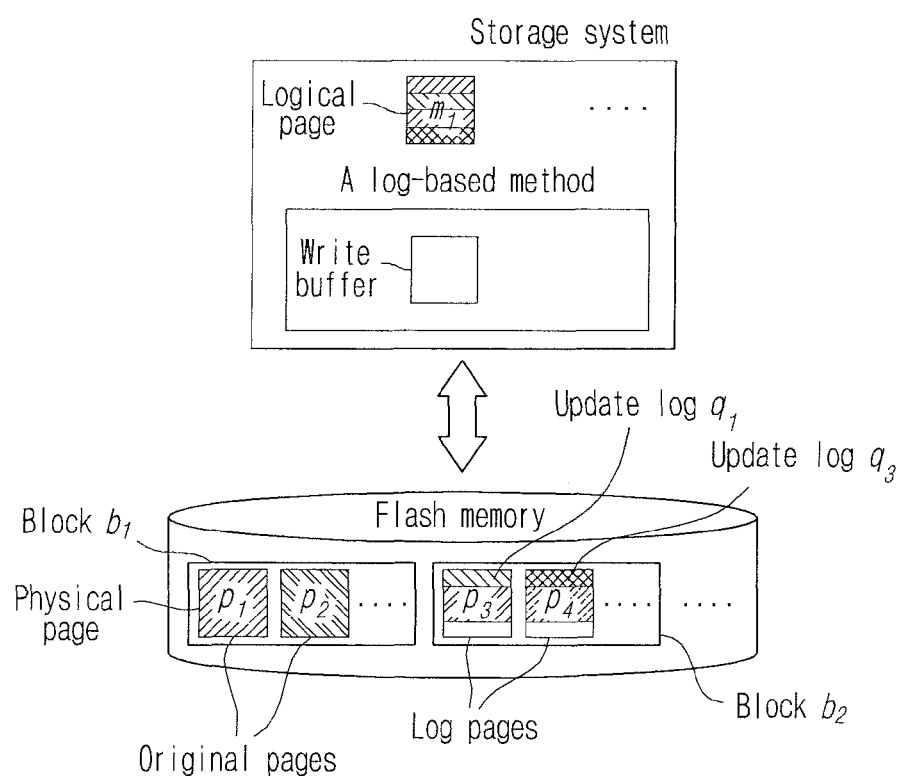
FIG. 4D is a diagram showing the logical page $m_1$ recreated from flash memory in an example of the log-based approach.
Figure 4E:
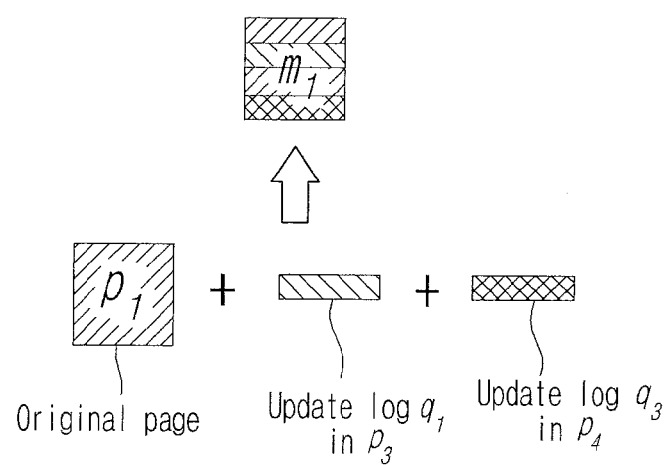
FIG. 4E is a diagram showing the process of creating the logical page $m_1$ in FIG. 4D.

Hereinafter, embodiments of the present invention will be described in detail with reference to the attached drawings.

The present invention proposes the page-differential logging method for flash-based storage systems.

In order to obtain excellent performance for both read and write operations, we present three design principles for page-differential logging.

The first is the 'writing difference only' principle. It guarantees that only the difference (i.e., the differential) is written when a logical page needs to be reflected into flash memory.

The second is the 'at-most-one-page writing' principle. It guarantees that at most one physical page is written even if a page is updated in memory many times when a logical page needs to be reflected into flash memory.

The third is the 'at-most-two-page reading' principle. It guarantees that at most two physical pages are read when a logical page is recreated from flash memory.

The present invention proposes the page-differential logging method conforming to the above-described three principles.

In page-differential logging, a logical page is stored into two physical pages: a base page and a differential page. Here, the base page contains the whole logical page, and the differential page contains a differential that is defined as the difference between the base page and the up-to-date logical page. The differential page can contain the differentials of multiple logical pages to prevent free space from being wasted.

A differential has the following two advantages compared to a set of update logs in the log-based methods. (1) The differential can be computed without maintaining all the update logs of a logical page. In other words, when an updated logical page needs to be reflected into flash memory, the differential can be computed by comparing the updated logical page with its base page. (2) A differential contains only the difference from the original page for the part that has been updated multiple times. When a specific part of the logical page is updated multiple times in memory, the set of update logs contains all changes. In contrast, the differential contains only the difference between the original data and the up-to-date data. For example, let us assume that a logical page has been updated twice as in [ . . . aaaaaa . . . → . . . bbbbba . . . → . . . bcccba . . . ]. In this case, the set of update logs contains both 'bbbbb' and 'ccc', whereas the differential contains only 'bcccb'.

When an updated logical page needs to be reflected into flash memory, the page differential logging method generates a differential by comparing the logical page with the base page in flash memory, and then, writes the differential into the one-page write buffer. Further, when the buffer is full, the buffer is written into flash memory. Therefore, the present method satisfies the 'writing difference only' principle.

When a logical page is updated, the present method just updates only the logical page in memory without maintaining update logs. The generating and writing of a differential is deferred until when the updated logical page needs to be reflected into flash memory. Therefore, the present method satisfies the 'guaranteeing at-most-one-page writing' principle.

Theoretically, the size of a differential cannot be larger than that of one page. However, practically, a differential contains not only changed data in a page, but also metadata such as offsets and lengths. Therefore, when a large part of the page is changed, the size of the differential can be larger than that of one page. In this case, in order to satisfy the 'at-most-one-page writing' principle, the generated differential is discarded, and the updated logical page itself is written into flash memory as a new base page. (In this special case, the page-differential logging method becomes identical to the page-based method.)

When a logical page is recreated from flash memory, the page-differential logging method reads the base page and the differential page, creating the logical page by merging the base page with its differential in the differential page. At this time, when the base page is not updated (that is, when the differential page does not exist), only one physical page is read. Therefore, since the present method reads at most two physical pages, it satisfies the 'at-most-two-page reading' principle.

FIGS. 5A to 5E illustrate the page-differential logging method. Here, base_page(p), differential_page(p), and differential(p) represent the base page, differential page and differential of a logical page p, respectively.

Figure 5A:
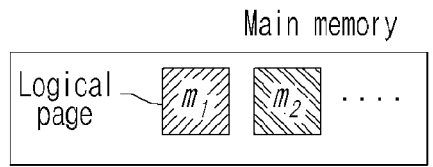
FIG. 5A is a diagram showing the logical pages $m_1$ and $m_2$ in memory in an example of the differential-based approach.

FIG. 5A illustrates the logical pages $m_1$ and $m_2$ in memory.

Figure 5B:
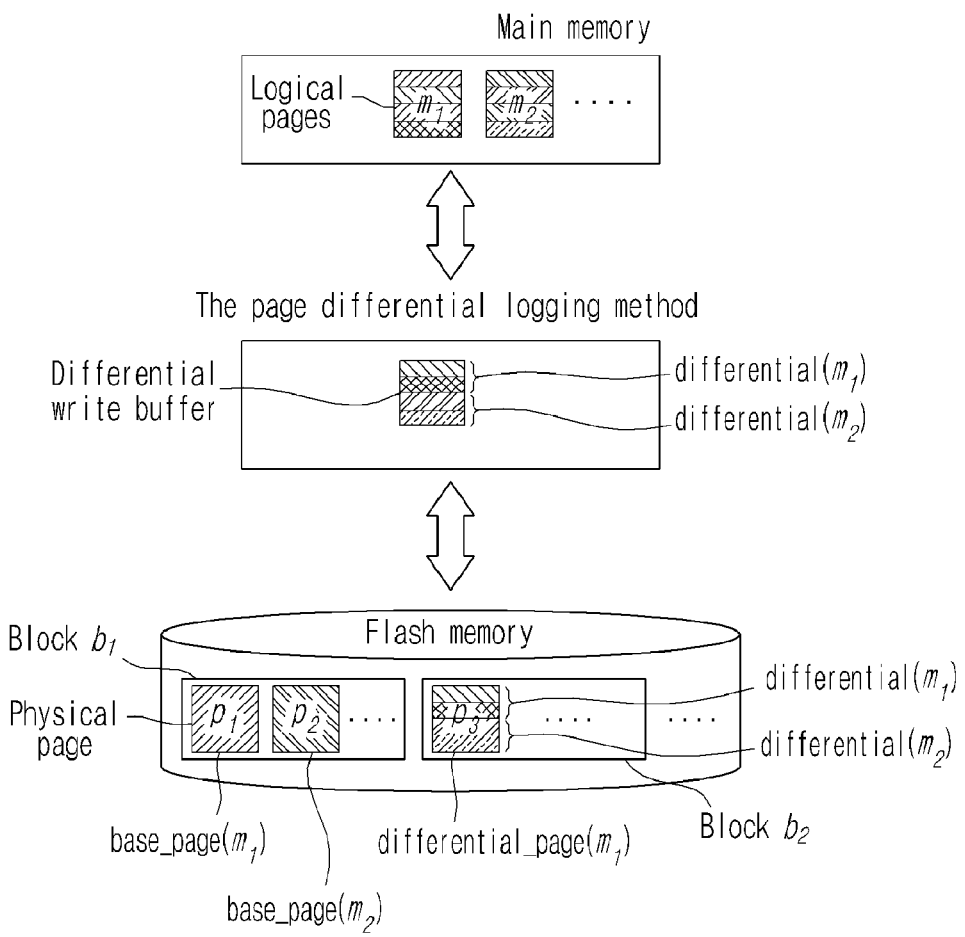
FIG. 5B is a diagram showing the updated logical pages $m_1$ and $m_2$, and the process of writing them into flash memory in an example of the differential-based approach.

FIG. 5B illustrates the updated logical pages $m_1$ and $m_2$, and the process of writing them into flash memory.

Figure 5C:
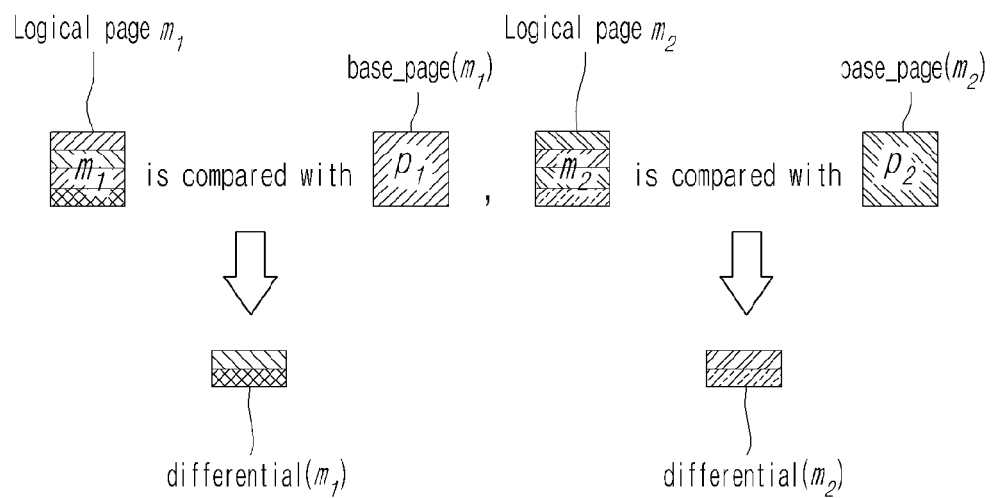
FIG. 5C is a diagram showing the process of creating differentials of the updated logical pages $m_1$ and $m_2$ in FIG. 5C.

FIG. 5C illustrates the process of creating differentials of the updated logical pages $m_1$ and $m_2$ by comparing them with their base pages;

When the updated logical pages $m_1$ and $m_2$ in FIG. 5B need to be reflected into flash memory, the page-differential logging method performs the following steps:

(1) The base pages $p_1$ and $p_2$ are read from flash memory.

(2) Differential($m_1$) and differential($m_2$) are generated by comparing the updated logical pages $m_1$ and $m_2$ with the base pages $p_1$ and $p_2$, respectively.

(3) Differential($m_1$) and differential($m_2$) are written into the write buffer. When the buffer is full, the buffer is written into the physical page $p_3$.

Therefore, the differentials of the updated logical pages $m_1$ and $m_2$ are written into the differential page $p_3$.

Figure 5D:
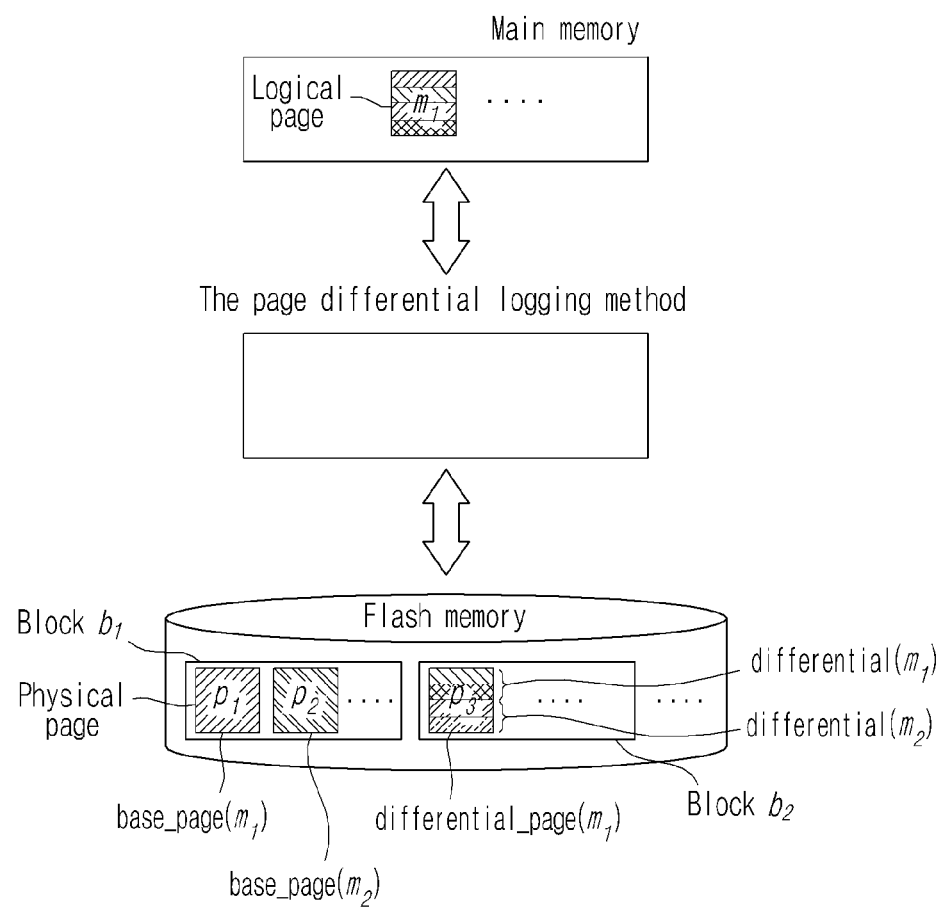
FIG. 5D is a diagram showing the logical page $m_1$ recreated from flash memory in an example of the differential-based approach.

FIG. 5D illustrates the logical page $m_1$ recreated from flash memory.

Figure 5E:
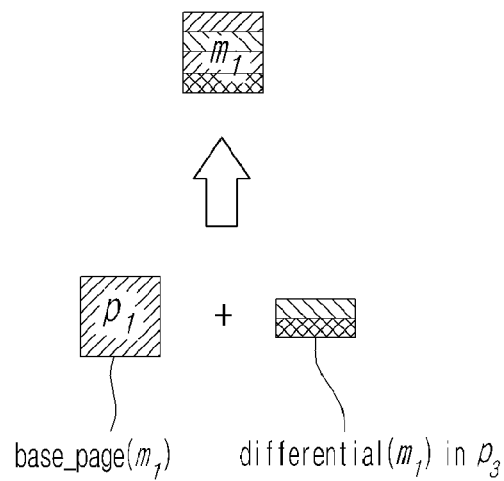
FIG. 5E is a diagram showing the process of creating the logical page $m_1$ in FIG. 5D.

FIG. 5E illustrates the process of creating the logical page $m_1$ by merging the base page $p_1$ with the differential $m_1$ in the differential page $p_3$.

The data structures used in flash memory are base pages, differential pages, and differentials. The base page stores a logical page in its data area, and stores a physical page identifier in its spare area. The physical page identifier represents the unique identifier of a page in the database. The differential page stores the differentials of logical pages. In order to identify the base page to which the differential belongs, the physical page identifier is stored into the differential. Therefore, the structure of a differential is in the form of <physical page identifier, [offset, length, changed data]⁺>.

The data structures used in memory are the physical page mapping table, the valid differential count table, and the differential write buffer. The physical page mapping table maps the physical page identifier into <base page address, differential page address>. In flash memory, since the location of a page can be changed due to the out-place scheme, the table is used to indirectly refer to a pair of a base page and a differential page in flash memory.

The valid differential count table counts the number of valid differentials (i.e., non-obsolete differentials). When the count becomes 0, the differential page is set to obsolete and is reused through garbage collection.

Figure 6:
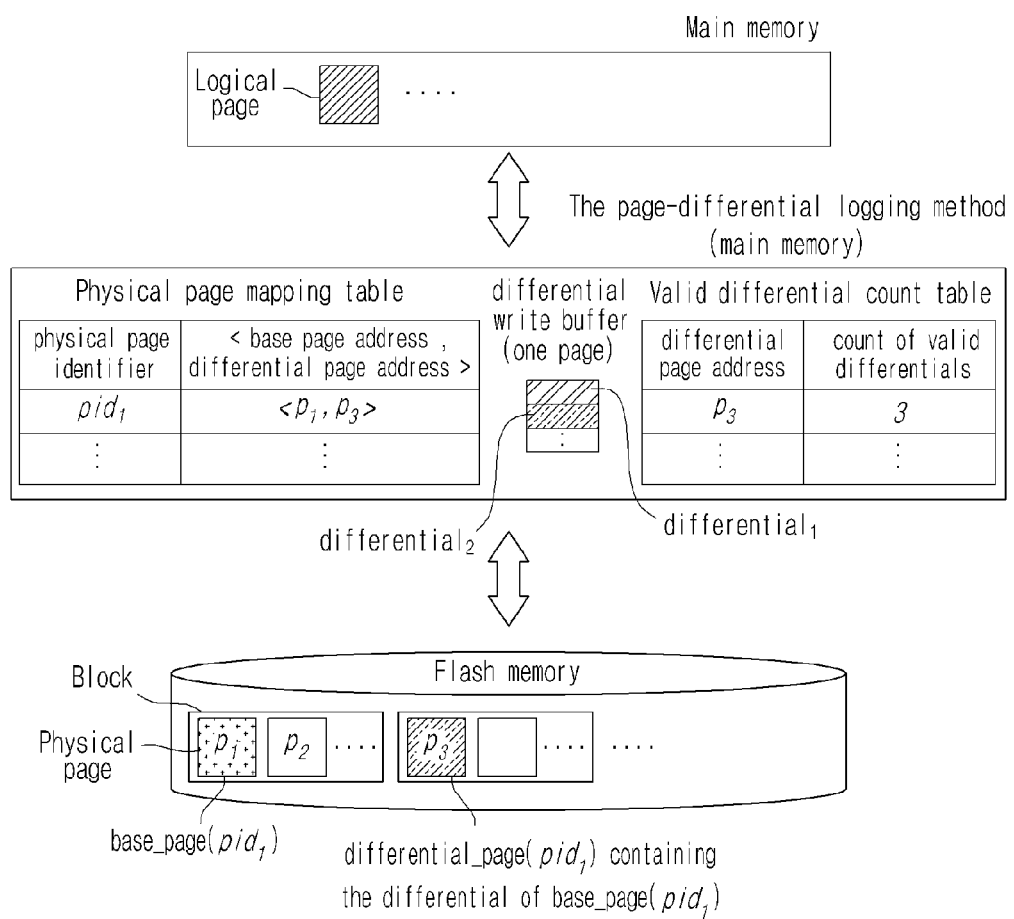
FIG. 6 is a diagram showing the data structure of the page-differential logging method.

The differential write buffer is used to collect differentials of logical pages into memory and later write them into a differential page in flash memory when the buffer is full. Since the differential write buffer is composed of one page, the amount of memory used is very small. FIG. 6 illustrates the data structures of the above-described page differential logging method.

The algorithm for writing a logical page into flash memory and the algorithm for recreating a logical page from flash memory are introduced.

These algorithms are called PageDifferentialLogging_Writing and PageDifferentialLogging_Reading, respectively.

Figure 8A:
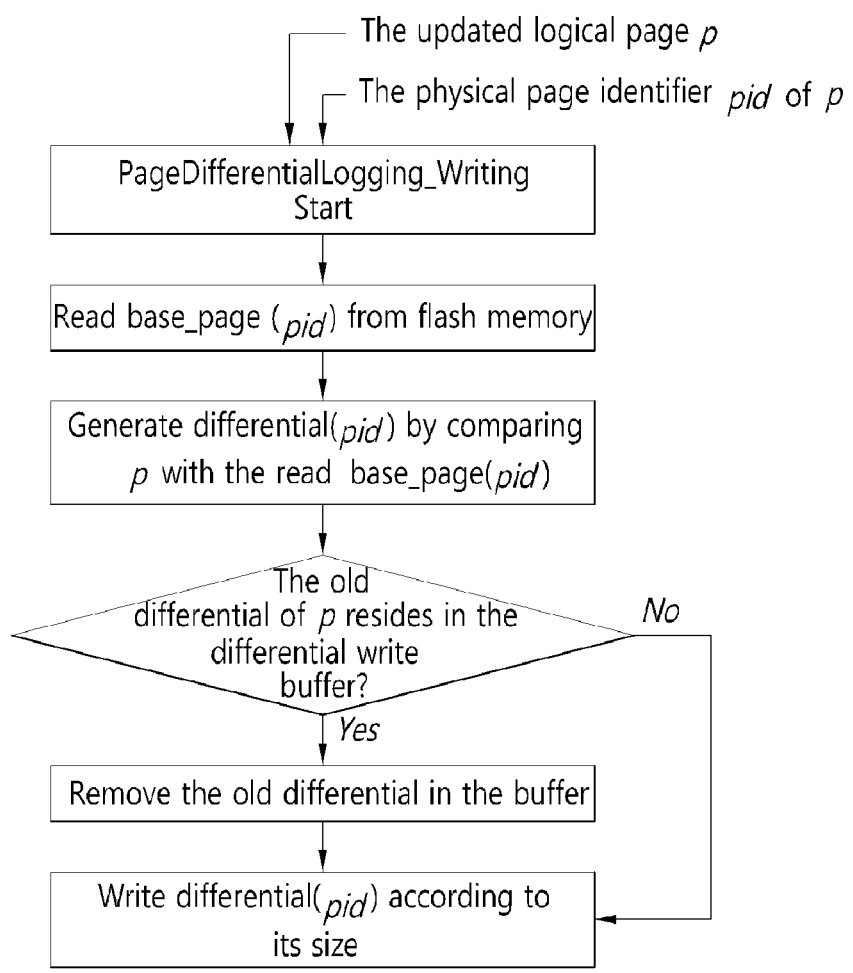
FIG. 8A is a diagram showing the flowchart of the algorithm in FIG. 7A.

FIG. 7A and FIG. 8A illustrate the algorithm PageDifferentialLogging_Writing for writing a logical page into flash memory.

The inputs to the algorithm PageDifferentialLogging_Writing are a logical page p and its physical page identifier pid. This algorithm consists of the following three steps.

At step 1, base_page(pid) is read from flash memory.

At step 2, differential(pid) is generated by comparing base_page(pid) read at step 1 with the logical page p given as an input.

At step 3, differential(pid) generated at step 2 is written into the differential write buffer. In this case, there are three cases according to the size of differential(pid). If the old differential of the logical page p resides in the buffer, the old differential is removed from the buffer, and the following procedures are performed.

First, if the size of differential(pid) is equal to or smaller than the free space of the differential write buffer (case 1), differential(pid) is simply written into the buffer.

Figure 8B:
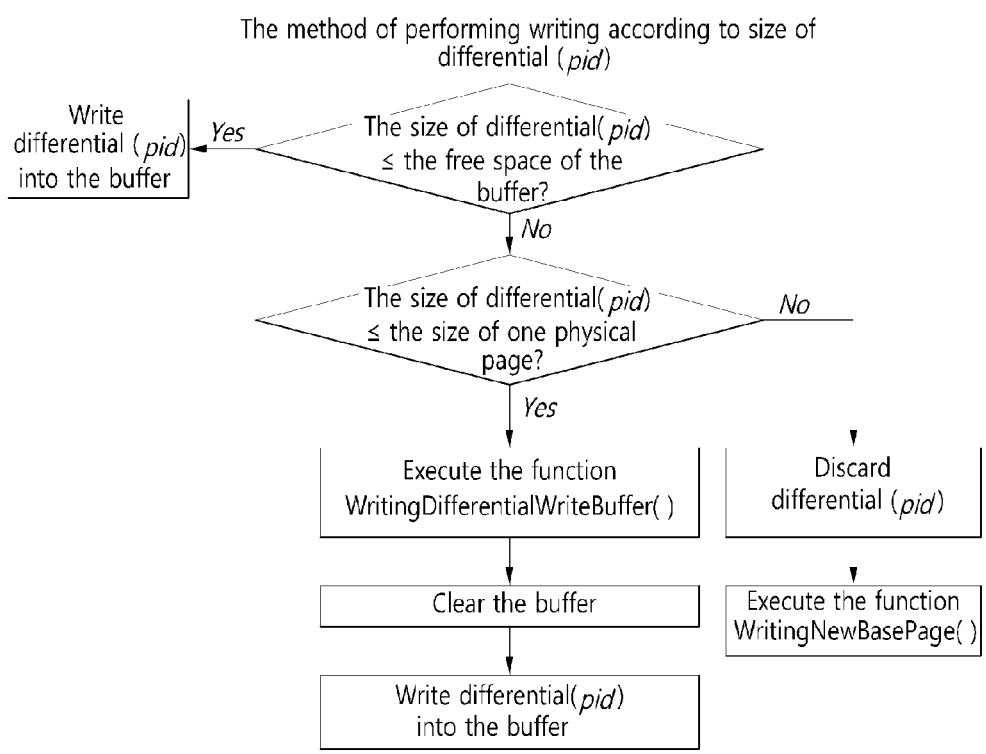
FIG. 8B is a diagram showing the flowchart of the step of writing a differential according to its size in FIG. 8A.
Figure 8C:
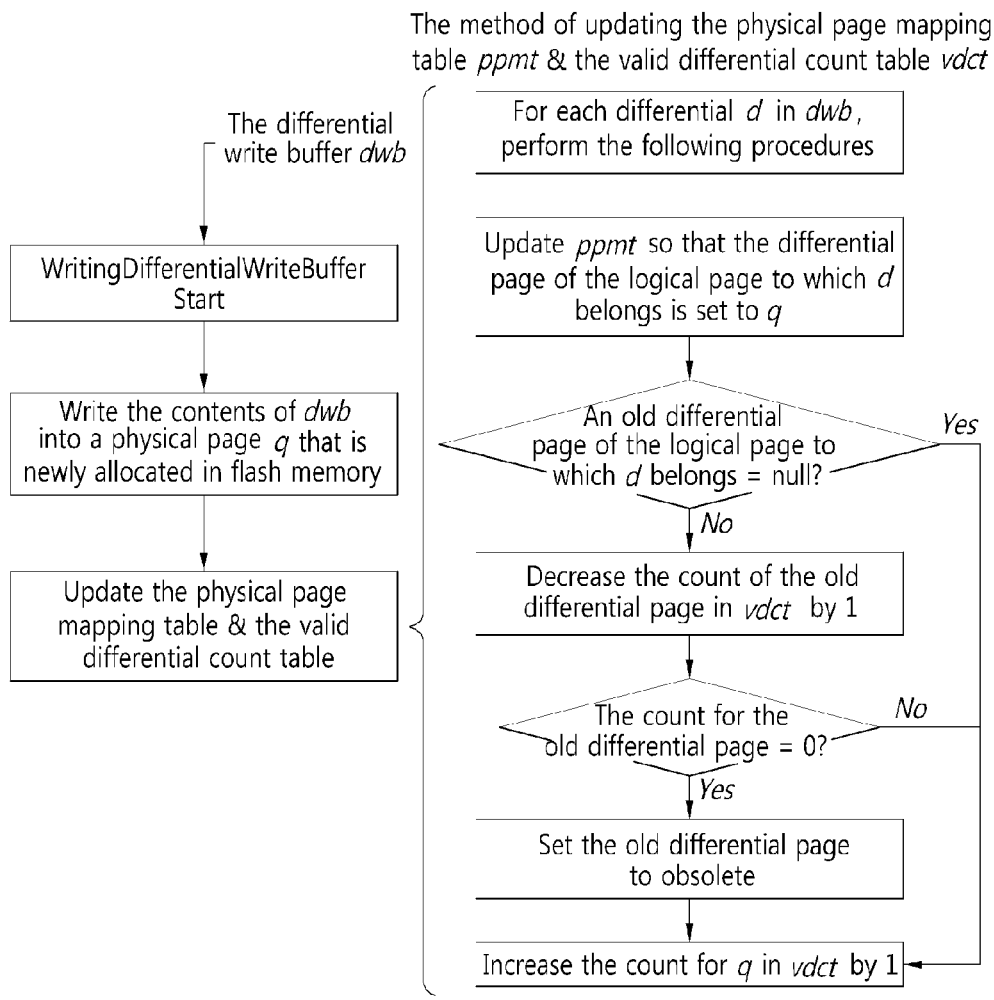
FIG. 8C is a diagram showing the flowchart of the function writingDifferentialWriteBuffer in FIG. 8B.

Second, if the size of differential(pid) is larger than the free space of the differential write buffer, but is equal to or smaller than that of one physical page (case 2), the function writingDifferentialWriteBuffer( ) is called, the buffer is cleared, and differential(pid) is written into the buffer. FIG. 7B and FIG. 8C illustrate the function writingDifferentialWriteBuffer( ). This function writes the content of the buffer into flash memory as a new differential page, and updates the physical page mapping table and the valid differential count table for each differential stored in the buffer. When the count becomes 0, the differential page is set to obsolete and is reused through garbage collection.

Figure 8D:
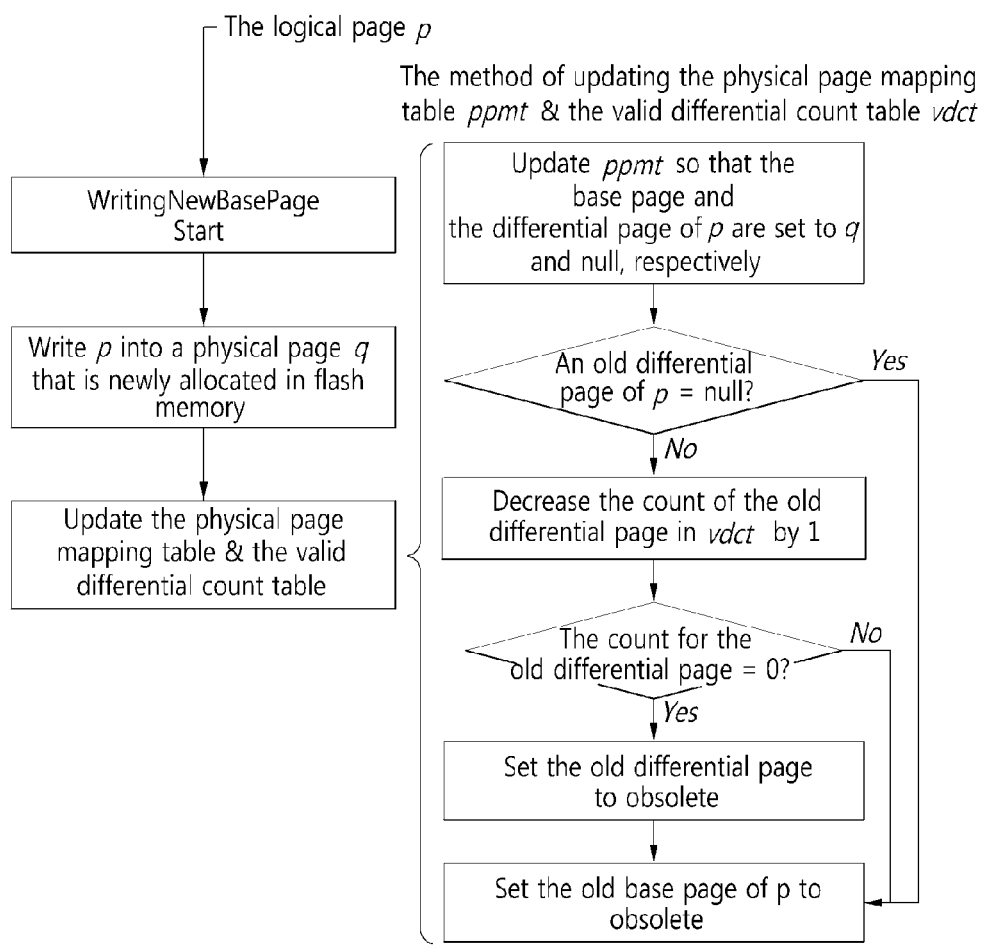
FIG. 8D is a diagram showing the flowchart of the function writingNewBasePage in FIG. 8B.

Finally, if the size of differential(pid) is larger than that of one physical page (case 3), differential(pid) generated is discarded, and the function writingNewBasePage( ) is called. FIG. 7C and FIG. 8D illustrate the function writingNewBasePage( ). This function writes the logical page p itself into flash memory as a new base page, updates the physical page mapping table and the valid differential count table, and sets the old base page to obsolete. FIG. 8B illustrates the three cases explained above.

Figure 10:
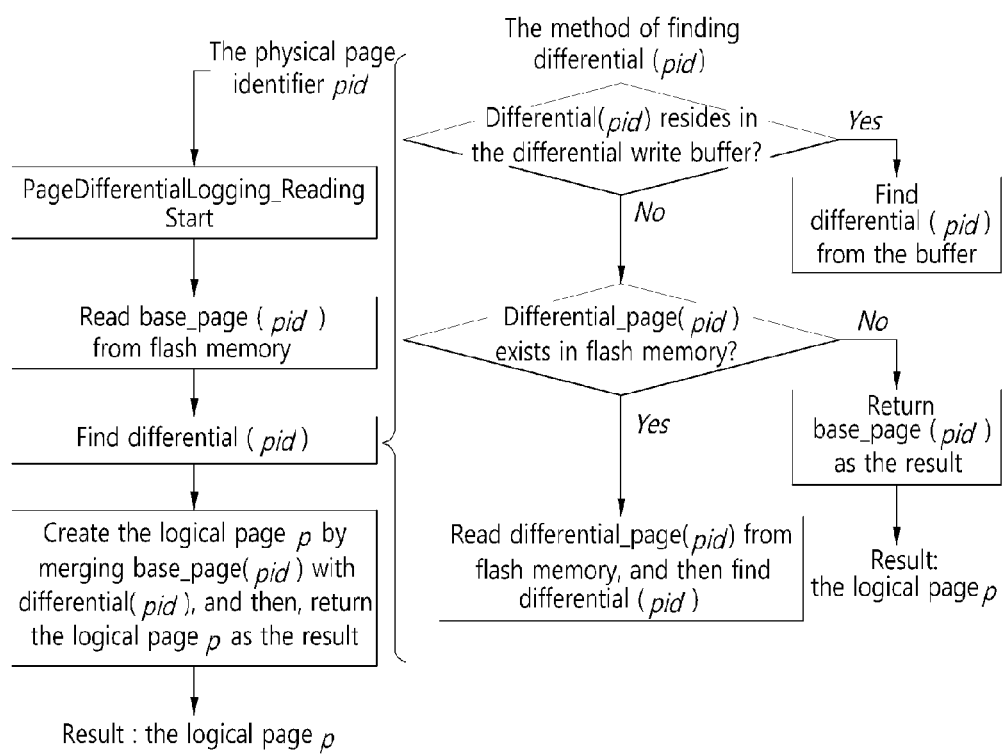
FIG. 10 is a diagram showing the flowchart of the algorithm in FIG. 9.

FIG. 9 and FIG. 10 illustrate the algorithm PageDifferentialLogging_Reading for recreating a logical page from flash memory.

The input to the algorithm PageDifferentialLogging_Reading is the physical page identifier pid of the logical page to read. This algorithm consists of the following three steps.

At step 1, base_page(pid) is read from flash memory.

At step 2, differential(pid) of base_page(pid) is found. In this case, there are two cases depending on the place in which differential(pid) resides.

First, when differential(pid) resides in the differential write buffer, i.e., when the buffer has not been yet written into flash memory, differential(pid) is found from the buffer.

Second, when differential(pid) does not reside in the differential write buffer, differential_page(pid) is read from flash memory, and then, differential(pid) is found from differential_page(pid). If differential_page(pid) does not exist in flash memory, base_page(pid) read at step 1 is returned as the result.

At step 3, the logical page p is recreated by merging base_page(pid) read at step 1 with differential(pid) found at step 2, and then, the logical page p is returned as the result.

Although the preferred embodiments of the page differential logging method that is a new approach to storing data into flash memory in a DBMS-independent manner according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of storing data into the flash memory in a database management system (DBMS)-independent manner using the page-differential, comprising:
    a writing step of storing a logical page into a base page and a differential page in the flash memory; and
    a recreating step of reading the base page and the differential page, and creating a logical page by merging the base page with its differential in the differential page.

2. The method according to claim 1, wherein the writing step comprises:
    a differential generating step of generating a differential by comparing the logical page with the base page in the flash memory;
    a differential writing step of writing the generated differential into the differential write buffer; and
    a buffer writing step of writing the content of the differential write buffer into the flash memory when the buffer is full.

3. The method according to claim 1, wherein the base page contains the whole logical page.

4. The method according to claim 1, wherein the differential page can contain differentials of multiple logical pages.

5. The method according to claim 1, wherein the differential is the difference between the base page in the flash memory and the logical page in the memory.

6. The method according to claim 1, wherein the writing step is performed only when an updated logical page needs to be reflected into the flash memory.

7. The method according to claim 1, wherein the writing step comprises:
- a first step of reading the base page of the logical page from the flash memory;
- a second step of generating the differential for the logical page by comparing the base page read at the first step with the logical page; and
- a third step of removing an old differential for the logical page if the old differential resides in the differential write buffer, and writing the generated differential into the write buffer.

8. The method according to claim 7, wherein the third step is a step of, when the size of the differential is equal to or smaller than the free space of the differential write buffer, writing the generated differential into the write buffer.

9. The method according to claim 7, wherein the third step comprises the steps of, when the size of the differential is larger than the free space of the differential write buffer, but is equal to or smaller than that of one physical page, writing the content of the buffer into the flash memory, clearing the buffer, and writing the differential into the buffer.

10. The method according to claim 9, wherein the step of writing the content of the differential write buffer into the flash memory comprises the steps of:
- writing the content of the buffer into a physical page that is newly allocated in the flash memory; and
- updating the physical page mapping table and the valid differential count table.

11. The method according to claim 10, wherein the updating step comprises, for each differential in the differential write buffer, the steps of:
- updating the physical page mapping table so that the differential page of the logical page to which the differential belongs is set to the new physical page;
- when an old differential page of the logical page to which the differential belongs is not null, decreasing the count for the old differential page in the valid differential count table by 1; and
- increasing the count for the new differential page in the valid differential count table by 1.

12. The method according to claim 11, further comprising, after the step of decreasing the count for the old differential page by 1, the step of setting the differential page to obsolete if the count for the old differential page becomes 0.

13. The method according to claim 7, wherein the third step comprises the steps of, when the size of the differential is larger than that of one physical page, discarding the generated differential and writing the logical page itself into the flash memory.

14. The method according to claim 13, wherein the step of writing the logical page comprises the steps of:
- writing the logical page into a physical page that is newly allocated in the flash memory; and
- updating a physical page mapping table and a valid differential count table.

15. The method according to claim 14, wherein the table updating step comprises the steps:
- updating the physical page mapping table so that the base page and the differential page of the logical page are set to the new physical page and null, respectively;
- when an old differential page of the logical page is not null, decreasing the count for the old differential page in the valid differential count table by 1; and
- setting the old base page of the logical page to obsolete.

16. The method according to claim 15, further comprising, after the step of decreasing the count for the old differential page by 1, the step of setting the differential page to obsolete if the count for the old differential page becomes 0.

17. The method according to claim 1, wherein the recreating step comprises:
- a first step of reading the base page of the logical page from the flash memory;
- a second step of finding the differential of the logical page; and
- a third step of creating a logical page by merging the base page read at the first step with the differential found at the second step, and returning the logical page as the result.

18. The method according to claim 17, wherein the second step is performed to find the differential of the logical page from the differential write buffer when the differential resides in the buffer.

19. The method according to claim 17, wherein the second step comprises the steps of, when the differential does not reside in the differential write buffer, reading the differential page of the logical page from the flash memory, and finding the differential from the differential page read.

20. The method according to claim 19, further comprising the step of, before the step of reading the differential page of the logical page, returning the base page read at the first step as the result if the differential page of the logical page does not exist in the flash memory.

* * * * *